US011645079B2

(12) United States Patent
Gao et al.

(10) Patent No.: US 11,645,079 B2
(45) Date of Patent: May 9, 2023

(54) GAIN CONTROL FOR MULTIPLE DESCRIPTION CODING

(71) Applicant: Agora Lab, Inc., Santa Clara, CA (US)

(72) Inventors: Zehua Gao, Shanghai (CN); Ruofei Chen, Shanghai (CN); Siqiang Yao, Shanghai (CN); Shie Qian, Irvine, CA (US)

(73) Assignee: Agora Lab, Inc., Santa Clara, CA (US)

( * ) Notice: Subject to any disclaimer, the term of this patent is extended or adjusted under 35 U.S.C. 154(b) by 67 days.

(21) Appl. No.: 16/735,021

(22) Filed: Jan. 6, 2020

(65) Prior Publication Data

US 2020/0142703 A1 May 7, 2020

Related U.S. Application Data

(62) Division of application No. 15/679,513, filed on Aug. 17, 2017, now Pat. No. 10,628,165.

(51) Int. Cl.
*G06F 9/38* (2018.01)
*H04N 19/126* (2014.01)
(Continued)

(52) U.S. Cl.
CPC ......... *G06F 9/3851* (2013.01); *H04N 19/124* (2014.11); *H04N 19/126* (2014.11);
(Continued)

(58) Field of Classification Search
CPC ............. H04L 67/2861; H04N 19/176; H04N 19/513; H04N 19/51; H04N 19/182;
(Continued)

(56) References Cited

U.S. PATENT DOCUMENTS

| | | | |
|---|---|---|---|
| 2004/0102968 A1* | 5/2004 | Tian ................... | G10L 19/167 704/226 |
| 2006/0015792 A1* | 1/2006 | Vitali ................... | H04N 19/59 375/E7.091 |

(Continued)

OTHER PUBLICATIONS

P.L. Dragotti; S.D. Servetto ; M. Vetterli, "Optimal filter banks for multiple description coding: analysis and synthesis," IEEE Transactions on Information Theory, vol. 48, Issue: 7, Jul. 2002.

(Continued)

*Primary Examiner* — Jungwon Chang
(74) *Attorney, Agent, or Firm* — Young Basile Hanlon & MacFarlane, P.C.

(57) ABSTRACT

A method for encoding multiple descriptions for a media stream includes: determining, for a current block of the media stream, a first number of duplicate blocks, determining, for the current block, a plurality of complementary forward gain factors, and determining a first number of descriptions for the current block by applying the plurality of complementary forward gain factors to the first number of duplicate blocks. A method for decoding multiple descriptions for a media stream includes: determining, for a current block of the media stream, a first number of descriptions from the media stream, in which each description comprises a scaled block corresponding to the current block, determining backward gain factors for the first number of scaled blocks, and determining the current block by applying the backward gain factors to the first number of scaled blocks.

16 Claims, 7 Drawing Sheets

(51) Int. Cl.
  H04N 19/124 (2014.01)
  H04N 19/176 (2014.01)
  H04N 19/39 (2014.01)
  H04N 19/65 (2014.01)
(52) U.S. Cl.
  CPC ........... *H04N 19/176* (2014.11); *H04N 19/39* (2014.11); *H04N 19/65* (2014.11)
(58) Field of Classification Search
  CPC .... H04N 19/61; H04N 19/119; H04N 19/593; H04N 19/13; H04N 19/39; H04N 19/117; H04N 19/59; H04N 19/126; H04N 19/124; H04N 19/65; G06F 9/3851
  See application file for complete search history.

(56) References Cited

U.S. PATENT DOCUMENTS

| | | | | |
|---|---|---|---|---|
| 2007/0189623 | A1* | 8/2007 | Ryu | H04N 19/117 375/E7.182 |
| 2009/0074074 | A1 | 3/2009 | Au et al. | |
| 2010/0091901 | A1* | 4/2010 | Zhan | H03M 13/6312 375/267 |
| 2014/0098856 | A1* | 4/2014 | Gu | H04N 19/61 375/240.03 |
| 2016/0366415 | A1* | 12/2016 | Liu | H04N 19/119 |
| 2018/0048907 | A1* | 2/2018 | Rusanovskyy | H04N 19/51 |
| 2019/0104303 | A1* | 4/2019 | Xiu | H04N 19/182 |
| 2019/0166370 | A1* | 5/2019 | Xiu | H04N 19/176 |
| 2019/0297325 | A1* | 9/2019 | Lim | H04N 19/119 |
| 2019/0394471 | A1* | 12/2019 | Heo | H04N 19/124 |

OTHER PUBLICATIONS

N. Franchi, M. Fumagalli, R. Lancini, and S. Tubaro, "Multiple description video coding for scalable and robust transmission Over IP," IEEE Trans. on Circuits and Systems for Video Technology, vol. 15, No. 3, pp. 321-334, Mar. 2005.

Frank-Dayan, Y., et al., "Dithered Lattice-Based Quantizers for Multiple Descriptions, <http://scholar.google.com/scholar?q=%22Dithered+Lattice-Based+Quantizers+for+Multiple+Descriptions%2C%22>" IEEE Transactions on Information Theory, vol. 48, No. 1, Jan. 2002, pp. 192-204.

Goyal, V.K., Kovacevic, J., "Generalized multiple description coding with correlating transforms," IEEE Trans. Inf. Theory, 2001, 47, (6), pp. 2199-2224.

Goyal, V., "Multiple description coding: compression meets the network," IEEE Sig. Proc. Mag., vol. 18, pp. 74-93, Sep. 2001.

Huang, X., et al., "Optimal Index Assignment for Multiple Description Lattice Vector Quantization, <http://scholar.google.com/scholar?q=%22Optimal+Index+Assignment+for+Multiple+Description+Lattice+Vector+Quantization%2C%22>" Department of Electrical & Computer Engineering, Proceedings of the Data Compression Conference (DCC'06), 10 pages.

Jafarkhani, H., Tarokh, V.: 'Multiple description trellis-coded quantization', IEEE Trans. Commun., 1999, 47, (6), pp. 799-803.

Klejsa et al., Adaptive Resolution-Constrained Scalar Multiple-Description Coding, IEEE International Conference on Acoustics, Speech & Signal Processing, Apr. 2008.

Klejsa, J., et al., "Flexcode-Flexible Audio Coding, <http://scholar.google.com/scholar?q=%22Flexcode-Flexible+Audio+Coding%2C%22>" Acoustics Speech and Signal Processing, ICSDDP 2010, XP031697767, Mar. 14, 2010, pp. 361-364.

Klejsa, J., et al., "Multiple Description Distribution Preserving Quantization (Embodiments), <http://scholar.google.com/scholar?q=%22Design+Algorithm+of+Multiple+Description+Distribution+Preserving+Quantization+%28Embodiments%29%2C%22>" Appendix A, Rev. 1, 19 pages.

Li, M., et al., "Quantization with Constrained Relative Entropy and its Application to Audio Coding, <http://scholar.google.com/scholar?q=%22Quantization+with+Constrained+Relative+Entropy+and+its+Application+to+Audio+Coding%2C%22>" Audio Engineering Society, Convention Paper, Presented at the 127th Convention, Oct. 9-12, 2009, 8 pages.

Li, M., et al., "Distribution Preserving Quantization With Dithering and Transformation, <http://scholar.google.com/scholar?q=%22Distribution+Preserving+Quantization+With+Dithering+and+Transformation%2C%22>" IEEE Signal Processing Letters, vol. 17, No. 12, Dec. 2010, pp. 1014-1017.

Ostergaard, J., et al., "n-Channel Entropy-Constrained Multiple-Description Lattice Vector Quantization, <http://scholar.google.com/scholar?q=%22n-Channel+Entropy-Constrained+Multiple-Description+Lattice+Vector+Quantization%2C%22>" IEEE Transactions on Information Theory, vol. 52, No. 5, May 2006, pp. 1956-1973.

Ostergaard, J., et al., "n-Channel Asymmetric Entropy-Constrained Multiple-Description Lattice Vector Quantization, <http://scholar.google.com/scholar?q=%22n-Channel+Asymmetric+Entropy-Constrained+Multiple-Description+Lattice+Vector+Quantization%2C%22>" IEEE Transactions on Information Theory, vol. 56, No. 12, Dec. 2010, pp. 6354-6375.

Tian, C., et al., "Universal Multiple Description Scalar Quantization: Analysis and Design, <http://scholar.google.com/scholar?q=%22Universal+Multiple+Description+Scalar+Quantization%3A+Analysis+and+Design%2C%22>" IEEE Transactions on Information Theory, vol. 50, No. 9, Sep. 2004, pp. 2089-2102.

V. A. Vaishampayan, "Design of Multiple Description Scalar Quantizers, <http://scholar.google.com/scholar?q=%22Design+of+Multiple+Description+Scalar+Quantizers%2C%22>" IEEE Trans. on Information Theory, vol. 39, No. 3, May 1993; pp. 821-857.

V. A. Vaishampayan and J. Domaszewicz, "Design of Entropy-Constrained Multiple-Description Scalar Quantizers, <http://scholar.google.com/scholar?q=%22Design+of+Entropy-Constrained+Multiple-Description+Scalar+Quantizers%2C%22>" IEEE Trans. on Information Theory, vol. 40, No. 1, Jan. 1994, pp. 245-250.

Vaishampayan, V.A., Sloane, N.J.A., Servetto, S.D.: 'Multiple-description vector quantization with lattice codebooks Design and analysis', IEEE Trans. Inf. Theory, 2001, 47, (5), pp. 1718-1734.

Valipour, M., Lahouti, F.: 'Channel optimized distributed multiple description coding', IEEE Trans. Signal Process., 2012, 60, (5), pp. 2539-2551.

Wang, Y., Reibman, A.R. and Lin, S. Multiple description coding for video delivery, Proc. of the IEEE, vol. 93, No. 1, pp. 57-70, Jan. 2005.

\* cited by examiner

GAIN CONTROL FOR MULTIPLE DESCRIPTION CODING

CROSS REFERENCE TO RELATED APPLICATION

This application is a divisional of U.S. patent application Ser. No. 15/679,513 filed Aug. 17, 2017, which is incorporated herein by reference in its entirety.

TECHNICAL FIELD

This disclosure relates to multiple description coding (MDC) techniques for media source signals, and in particular to signal preprocessing for the MDC techniques including gain control.

BACKGROUND

Data compression techniques have been developed over the last several decades to reduce the large bandwidth needed by transmission of media (audio, video, or multimedia) data. One side effect of data compression is that the compressed media data is sensitive to data loss or noise, which can happen in best-effort networks. In some cases, loss of a few bits can cause an entire packet to be unrecognizable. As end user devices and network environments become more diversified, reliable media data transmission over noisy networks becomes more challenging.

To reduce data loss in media transmission over noisy networks, various techniques have been developed, such as Forward Error Correction (FEC), Automatic Repeat Request (ARQ), and Packet Loss Concealment (PLC). For example, multiple description coding (MDC) can be used for error-resilient media transmission.

SUMMARY

Disclosed herein are implementations of methods, apparatuses, and systems for preprocessing signal (e.g., gain control) for multiple description coding.

In one aspect, a method for encoding multiple descriptions for a media stream is disclosed. The method comprises determining, for a current block of the media stream, a first number of duplicate blocks, determining, for the current block, a plurality of complementary forward gain factors, and determining a first number of descriptions for the current block by applying the plurality of complementary forward gain factors to the first number of duplicate blocks.

In another aspect, a method for decoding multiple descriptions for a media stream is disclosed. The method comprises determining, for a current block of the media stream, a first number of descriptions from the media stream, wherein each description comprises a scaled block corresponding to the current block, determining backward gain factors for the first number of scaled blocks, and determining the current block by applying the backward gain factors to the first number of scaled blocks.

In another aspect, a non-transitory computer-readable medium stores instructions which, when executed by a computer system using a processor, become operational with the processor for decoding multiple descriptions for a media stream. The non-transitory computer-readable medium comprises instructions to determine, for a current block of the media stream, a first number of descriptions from the media stream by dequantizing quantization data decoded from the media stream, wherein each description comprises a scaled block corresponding to the current block, determine backward gain factors for the first number of scaled blocks, and determine the current block by applying the backward gain factors to the first number of scaled blocks.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
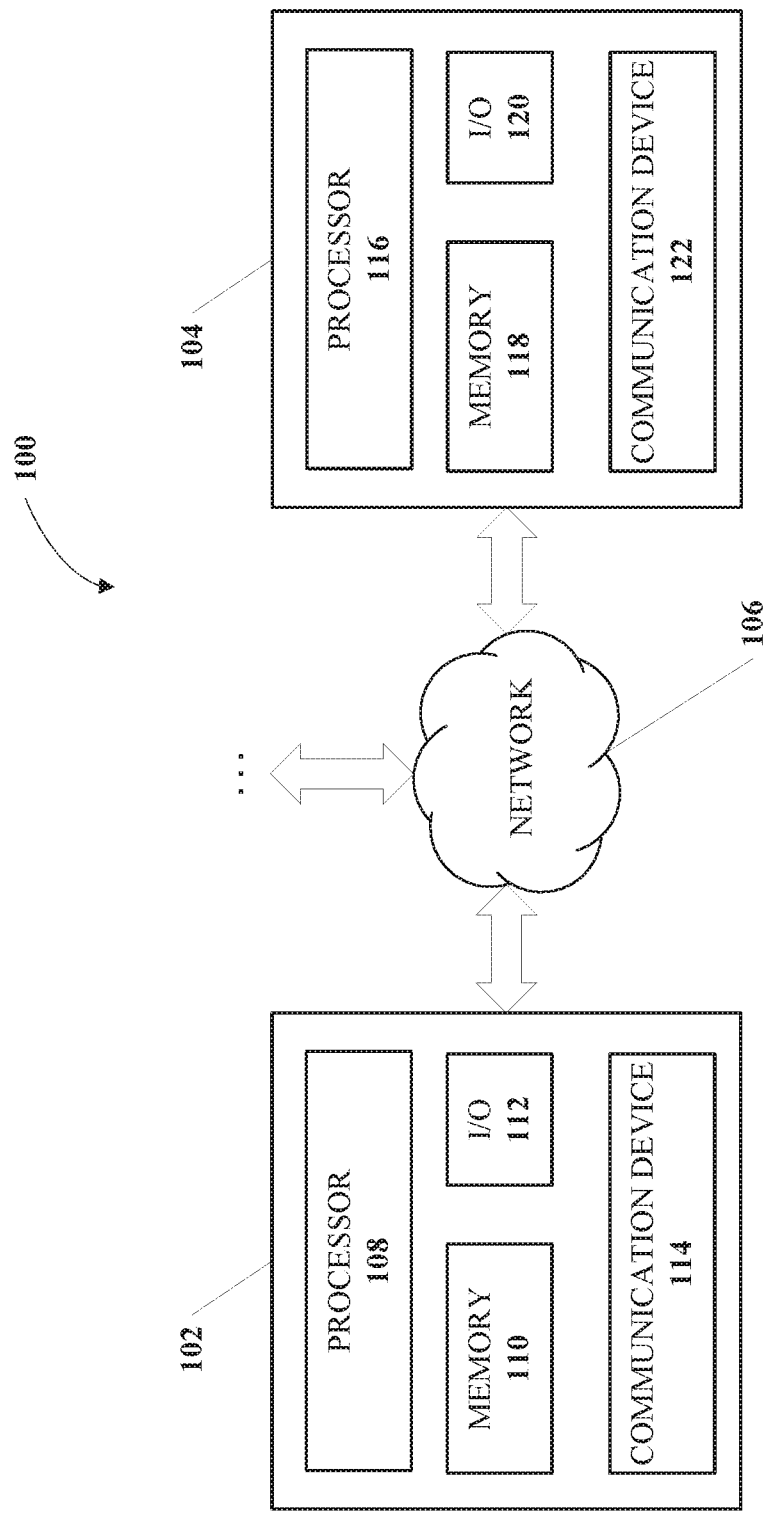
FIG. 1 is a diagram of an example system for media transmission using MDC techniques according to implementations of this disclosure.

Online multimedia data sharing, such as a video conference call, a live-stream video broadcasting, or an Internet phone service, requires media data transmission with efficiency and fidelity. The media data can include audio data, video data, or any multimedia data including an audio sequence or a video sequence. Typically, media data can be stored in its original form or converted to form a media source stream. The media source stream can include time sequence data (e.g., an audio sequence including multiple audio samples, or a video sequence including multiple pictures or frames), feature extracted residuals of the media source stream (e.g., a residual picture after inter-prediction for a current picture in a video sequence), or equivalent quantities of the media source stream in a transformed domain (e.g., transformed and/or quantized coefficients). The media source stream can be encoded (or "compressed") into a media bitstream for transmission over a network.

Certain coding techniques (e.g., MP-3 and MP-4) can be used to improve decoding quality in progressive transmission as the number of received consecutive packets increases. The improvement of the coding quality can be achieved when all earlier packets have been received. However, when the order of the packets is received out of sequence (e.g., when a packet is lost or received late), the decoding process for those coding techniques can be interrupted until the lost packet is received. In those cases, excessive delays can occur at the decoder.

Multiple description coding (MDC) is a technique that can divide a media (e.g., audio, video, or multimedia) stream into multiple sub-streams (referred to as "descriptions") for encoding and decoding. Each description can provide an approximation to a media source stream. Each description can represent the media source stream with a certain level of fidelity or confidence.

An MDC-compatible decoder can decode one or more descriptions or a subset of the descriptions to reconstruct the media source stream. For a decoder receiving multiple descriptions, a media stream can be reconstructed using an approximation of the media source stream by using the multiple descriptions, the quality of which can be better than a media stream reconstructed using any individual description. The more descriptions received, the higher fidelity the decoded media stream can achieve. Better signal preprocessing techniques of the MDC are strived for to improve MDC coding quality and reduce computation cost.

By introducing a certain level of redundancy for mitigating the effect of packet loss, MDC can provide error resilience to media stream transmission. In MDC, an arbitrary subset of the descriptions can be used to reconstruct the media stream. When network congestion or packet loss occurs, which is common in best-effort networks (e.g., the Internet), the media stream can be reconstructed with a loss of quality (e.g., resolution or fidelity) without interruption. In some cases, the quality of the media stream is roughly proportional to the data rate sustained by the decoder.

Development of the MDC techniques can focus on one of two categories. The first category focuses on designing specific transforms or filterbanks to obtain the MDC properties, in which the MDC techniques can be performed after the transform stage and before the quantization stage. The second category focuses on designing specific quantizers to meet the MDC constraints, in which the MDC techniques can be performed after the quantization stage that follows the transform stage.

MDC processing methods, apparatuses, and systems disclosed in the present disclosure focus on signal preprocessing, and can be applied to channel coding, source coding, or a combination of the above. According to implementations of this disclosure, a signal can be preprocessed (e.g., signal partitioning and gain control) using MDC techniques prior to the quantization stage. In one example, the MDC-based signal preprocessing can be performed before the transform stage, followed by the quantization stage. In another example, the MDC-based signal preprocessing can be performed after the transform stage and before the quantization stage. In another example, the MDC-based signal preprocessing can be performed before the quantization stage in an encoding process without the transform stage.

According to implementations of this disclosure, the disclosed methods, apparatuses, and systems can adapt to different data types or computation environments, such as integer, fixed-point, or floating point. In addition, the disclosed methods, apparatuses, and systems for MDC encoding and decoding can be used in any computing system as a software or hardware module, and can be performed for any image, audio, video, or other digital-signal system with any bounded signal dynamic range, including but not limited to 8- or 10-bit images or videos, 8-, 16-, or 24-bit digital audio signals, 32-bit floating-point digital audio signals, or small-bit (e.g., 2-bit) digital signals. It should be noted that the applications and implementations of this disclosure are not limited to the aforementioned examples, and alternations, variations, or modifications of the implementations of this disclosure can be achieved to minimize quantization errors for any computation environment without creative effort.

The MDC properties can be obtained before quantization, for example. The MDC properties can include multiple gain factors determined based on characteristics (e.g., energy characteristics, or statistic characteristics) of the media source stream. The media source stream can be duplicated to form multiple raw descriptions, then respectively applied with the gain factors to form multiple scaled descriptions. The multiple scaled descriptions can be quantized to form a bitstream for transmission. The gain factors can be used to control the error resilience of the encoded media bitstream, which can improve coding quality and reduce computation cost.

FIG. 1 is a diagram of an example system 100 for media transmission using MDC techniques according to implementations of this disclosure. As shown in FIG. 1, the system 100 can include multiple apparatuses and networks, such as an apparatus 102, an apparatus 104, and a network 106. The apparatuses can be implemented by any configuration of one or more computers, such as a microcomputer, a mainframe computer, a supercomputer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, or a computing service provided by a computing service provider, e.g., a web host, or a cloud service provider. In some implementations, the computing device can be implemented in the form of multiple groups of computers which are at different geographic locations and can communicate with one another, such as by way of a network. While certain operations can be shared by multiple computers. In some implementations, different computers are assigned with different operations. In some implementations, the system 100 can be implemented using general-purpose computers/processors with a computer program that, when executed, carries out any of the respective methods, algorithms, and/or instructions described herein. In addition, or alternatively, for example, special purpose computers/processors including specialized hardware can be utilized for carrying out any of the methods, algorithms, or instructions described herein.

The apparatus 102 can have an internal configuration of hardware including a processor 108 and a memory 110. The processor 108 can be any type of device or devices capable of manipulating or processing information. In some implementations, the processor 108 can include a central processor (e.g., a central processing unit or CPU). In some implementations, the processor 108 can include a graphics processor (e.g., a graphics processing unit or GPU). Although the examples herein can be practiced with a single processor as shown, advantages in speed and efficiency can be achieved using more than one processor. For example, the processor 108 can be distributed across multiple machines or devices (each machine or device having one or more of processors) that can be coupled directly or connected via a network (e.g., a local area network). The memory 110 can include any transitory or non-transitory device or devices capable of storing codes and data that can be accessed by the processor (e.g., via a bus). The memory 110 herein can be a random access memory device (RAM), a read-only memory device (ROM), an optical/magnetic disc, a hard drive, a solid state drive, a flash drive, a security digital (SD) card, a memory stick, a compact flash (CF) card, or any combination of any suitable type of storage device. In some implementations, the memory 110 can be distributed across multiple machines or devices, such as a network-based memory or cloud-based memory. The memory 110 can include data (not shown), an operating system (not shown), and an application (not shown). The data can include any data for processing (e.g., an audio stream, a video stream, or a multimedia stream). The application can include programs that permit the processor 108 to implement instructions to generate control signals for performing functions of the methods in the following description.

In some implementations, in addition to the processor 108 and the memory 110, the apparatus 102 can also include a secondary (e.g., external) storage device (not shown). When present, the secondary storage device can provide additional memory when high processing needs exist. The secondary storage device can be a storage device in the form of any suitable non-transitory computer-readable medium, such as a memory card, a hard disc drive, a solid state drive, a flash drive, or an optical drive. Further, the secondary storage device can be a component of the apparatus 102 or can be a shared device accessible via a network. In some implementations, the application in the memory 110 can be stored in whole or in part in the secondary storage device and loaded into the memory 110 as needed for processing.

In addition to the processor 108 and the memory 110, the apparatus 102 can include input/output (I/O) devices. For example, the apparatus 102 can include an I/O device 112. The I/O device 112 can be implemented in various ways, for example, it can be a display that can be coupled to the apparatus 102 and configured to display a rendering of graphic data. The I/O device 112 can be any device transmitting a visual, acoustic, or tactile signal to a user, such as a display, a touch-sensitive device (e.g., a touch screen), a speaker, an earphone, a light-emitting diode (LED) indicator, or a vibration motor. The I/O device 112 can also be any type of input device either requiring or not requiring user intervention, such as a keyboard, a numerical keypad, a mouse, a trackball, a microphone, a touch-sensitive device (e.g., a touch screen), a sensor, or a gesture-sensitive input device. If the I/O device 112 is a display, for example, it can be a liquid crystal display (LCD), a cathode-ray tube (CRT), or any other output device capable of providing a visible output to an individual. In some cases, an output device can also function as an input device—a touchscreen display configured to receive touch-based input, for example.

The I/O device 112 can alternatively or additionally be formed of a communication device for transmitting signals and/or data. For example, the I/O device 112 can include a wired mean for transmitting signals or data from the apparatus 102 to another device. For another example, the I/O device 112 can include a wireless transmitter or receiver using a protocol compatible to transmit signals from the apparatus 102 to another device or to receive signals from another device to the apparatus 102.

In addition to the processor 108 and the memory 110, the apparatus 102 can optionally include a communication device 114 to communicate with another device. Optionally, the communication can be via a network 106. The network 106 can be one or more communications networks of any suitable type in any combination, including, but not limited to, networks using Bluetooth communications, infrared communications, near field connections (NFC), wireless networks, wired networks, local area networks (LAN), wide area networks (WAN), virtual private network (VPN), cellular data networks, or the Internet. The communication device 114 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to the apparatus 102 to provide functions of communication with the network 106.

Similar to the apparatus 102, the apparatus 104 includes a processor 116, a memory 118, an I/O device 120, and a communication device 122. The implementations of elements 116-122 of the apparatus 104 can be similar to the corresponding elements 108-114 of the apparatus 102. The apparatuses 102 and 104 can perform different functions for media transmission. For example, the apparatus 102 can be used as a decoding apparatus (referred to as a "decoder"), and the apparatus 104 can be used as an encoding device (referred to as an "encoder"), or vice versa. The apparatus 102 can communicate with the apparatus 104 via the network 106. The apparatuses 102 and 104 can also communicate with other apparatuses (not shown) connected to the network 106.

The apparatuses 102 and 104 (and algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors, or any other suitable circuit. In this disclosure, the term "processor" should be understood as encompassing any the foregoing, either singly or in combination. The terms "signal," "data," and "information" are used interchangeably. Further, portions of the apparatuses 102 and 104 do not necessarily have to be implemented in the same manner.

It should be noted that parts or components of the MDC-compatible coding devices (e.g., apparatuses 102 and 104) and systems can include elements not limited to those shown in FIG. 1. Without departing the scope of this disclosure, the MDC-compatible coding devices and systems can include more or fewer parts, components, and hardware or software modules for performing various functions in addition or related to MDC encoding and decoding.

The MDC techniques described in this disclosure can introduce a noticeable improvement in mitigating the effect of packet loss. In addition, it can be integrated with existing communication systems without significant effort. The MDC encoding can be performed to encode a media source stream for transmission with error resilience. Typical audio and video encoding processes will be described as follows.

Figure 2:
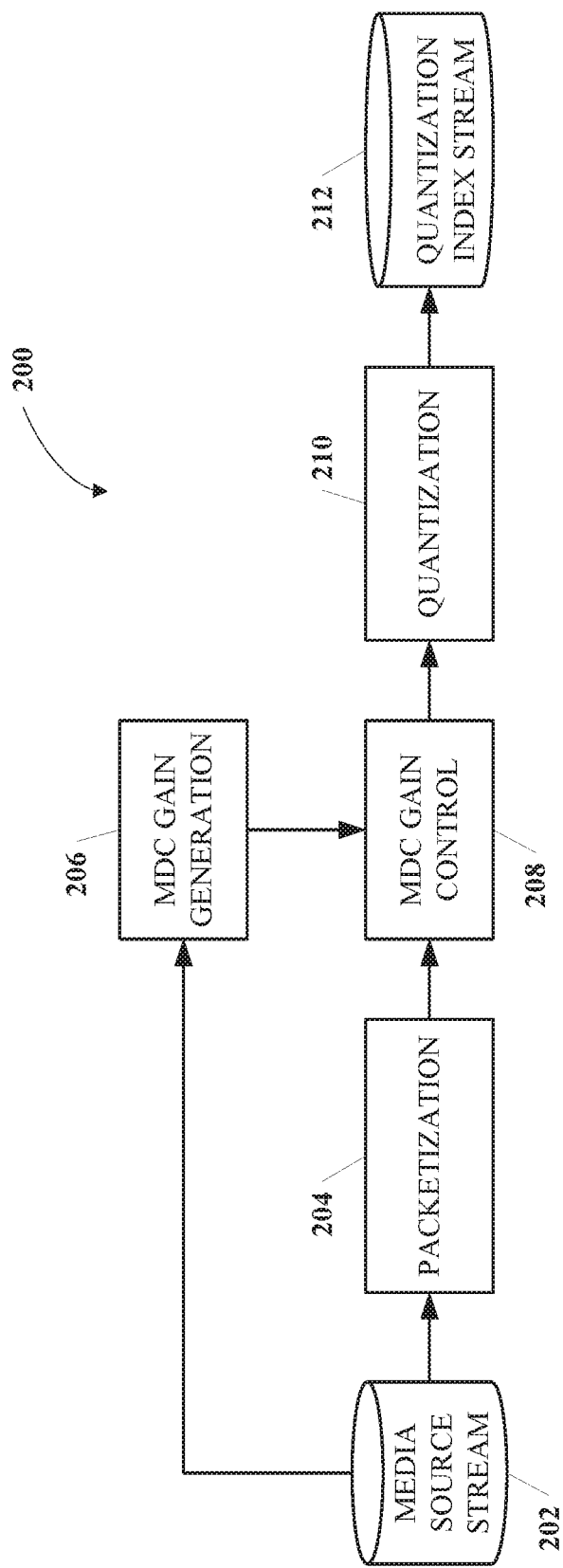
FIG. 2 is a diagram of an example MDC encoding process according to implementations of this disclosure.

FIG. 2 is a diagram of an example MDC encoding process 200 according to implementations of this disclosure. The process 200 can be implemented as software and/or hardware modules in the system 100 in FIG. 1. For example, some or all stages in the process 200 can be implemented as software or hardware modules included in the system 100 by an encoder (e.g., the apparatus 104). The encoder can be implemented by program codes stored in memory (e.g., the memory 118). The program codes can include computer-readable instructions that, when executed by a processor (e.g., the processor 116), cause the encoder to encode a media source stream in the manner described in FIG. 2. The encoder can also be implemented as specialized hardware included in an apparatus (e.g., the apparatus 104). For example, the encoder can be a hardware encoder. The process 200 includes data and operations 202-212 to produce an output quantization index stream 212 from a media source stream 202. The media source stream 202 can include an audio sequence (such as audio source stream), a video sequence (such as video source stream), or any multimedia source stream including audio and video data.

Generally, when encoding a video sequence, the encoding process can include the following stages or operations: a prediction stage (e.g., for intra-prediction or inter-prediction), a transformation and quantization stage, and an entropy encoding stage. The aforementioned stages can be included in a forward path of the encoding process. In the forward path of the encoding process, an encoded or compressed video bitstream can be produced using a video sequence as input. In some implementations, the encoding process can further include a reconstruction path for reconstructing reference pictures or frames for encoding a future picture at the prediction stage. The reconstruction path can include a dequantization and inverse transformation stage and a reconstruction stage between the transformation and quantization stage and the prediction stage. It should be noted that other variations of the encoding process can be used to encode the video sequence.

At the prediction stage, inter-prediction or intra-prediction can be performed for a current picture at the prediction stage. For example, for inter-prediction, motion estimation can be performed using the current picture and the reference data (e.g., one or more reference pictures). The motion estimation in the inter-prediction mode can generate motion data (e.g., motion vectors). The motion vectors can describe transformation (e.g., offsets) from blocks of the reference pictures to blocks of the current picture. Using the generated motion data and the reference data, motion compensation can be performed to generate motion-compensated data (referred to as "prediction data"). The prediction data can include a picture or a portion of the picture (e.g., a slice, a tile, a macroblock, or a block). For example, a motion-compensated picture (referred to as a "predicted picture") of the current picture can be determined by offsetting the blocks of the reference pictures in accordance with the motion vectors. The prediction data can be subtracted from the current picture to generate residual data (e.g., residual pictures, residual slices, residual tiles, residual macroblocks, or residual blocks). The reference data used in the inter-prediction can have been determined and stored in a buffer (e.g., in the memory 110 in FIG. 1). The residual data and the motion data can be entropy encoded in later operations, in which the residual data can be transformed and quantized before being entropy encoded.

For another example, if the intra-prediction is performed for the current picture, predicted blocks can be generated for a current block of the current picture using previously coded blocks from the current picture. The predicted block can be subtracted from the current block to determine residual data (e.g., residual blocks). The residual blocks can be transformed, quantized, and entropy encoded in later operations.

At the transformation and quantization stage, the residual data is transformed and quantized. The transformation can generate transform coefficients that can be encoded in a video bitstream for output. For example, if the transformation is block-based, it can use Karhunen-Loève Transform (KLT), Discrete Cosine Transform ("DCT"), Discrete Sine Transform ("DST"), or Singular Value Decomposition Transform ("SVD"). The transforms can transform a block into a frequency domain.

The quantization can convert the transform coefficients into discrete quantum values (referred to as "quantized transform coefficients"). The quantization can reduce the number of discrete states represented by the transform coefficients, thus reducing data sizes. The quantization can cause image quality loss during encoding and decoding (referred to as being "lossy").

At the entropy encoding stage, the transformed and quantized residual data, the motion data, and other related data can be entropy encoded to a video bitstream. Entropy coding can be performed by any lossless coding techniques such as, for example, fix-length or variable-length coding (e.g., Huffman coding or arithmetic coding). In some implementations, optionally, a loop filter can be additionally applied before the entropy encoding stage. The loop filter can reduce distortion (e.g., blocking artifacts) introduced by the video compression. Other information used to decode the resulted video bitstream can also be entropy encoded, such as the syntax data indicative of the used prediction mode (information indicating that the current block is intra-predicted or inter-predicted), transformation type, quantization level, and loop filter parameters (e.g., filter strength) of the optional loop filter.

In the reconstruction path, at the dequantization and inverse transformation stage, the transformed and quantized residual data and the motion data (e.g., the motion vectors) can be dequantized (inverse quantization) and inverse transformed for reconstruction at the reconstruction stage. The dequantization and inverse transformation stage and the reconstruction stage can ensure that both the encoder (e.g., the apparatus 104 in FIG. 1) and a decoder (e.g., the apparatus 102 in FIG. 1) can use the same reference data for prediction.

At the reconstruction stage, a reconstructed picture of the current picture can be determined. For example, a predicted picture can be determined using the reference data of the current picture and the dequantized and inverse transformed motion data determined at the dequantization and inverse transformation stage. The reconstructed picture can be determined by summing the predicted picture and the dequantized and inverse transformed residual data determined at the dequantization and inverse transformation stage. The reconstructed picture can be used as future reference data for encoding a future picture successive to the current picture. The reconstructed picture can be stored in a buffer (e.g., in the memory 118 in FIG. 1) to be used as the future reference data. In some implementations, optionally, a loop filter can be additionally applied after the reconstruction stage. In other implementations, the reconstructed picture can be used without using the loop filter. The reconstruction can be similar to a reconstruction stage in a decoding process.

After the entropy encoding stage, the entropy encoded video bitstream can be outputted. For example, the video bitstream can be stored as a computerized file. For another example, the video bitstream can be transmitted over a network (e.g., the network 106 in FIG. 1) to other devices (e.g., a decoder).

An audio sequence can be encoded like the video sequence, or using any audio compression techniques. For example, audio compression can include the following stages: a mapping stage, a quantization and coding stage, and a bitstream coding stage. Other stages can replace or added to one or more stages in the example.

It should be noted that other variations of the encoding process can be used to encode the video sequence. The data and operations in the encoding process can be processed and performed in different orders, combined into fewer stages, and/or divided into more stages without changing its purpose. For example, a non-transform based encoder can quantize the residual data without transformation. For another example, an encoder can have transformation and quantization stage performed in different stages.

MDC encoding can be implemented prior to, after, or during any stage of the audio or video encoding process. For example, the MDC encoding can be performed before quantization. For another example, the MDC encoding can be performed after transformation and before quantization. For another example, the MDC encoding can be performed in an encoding process that has no transformation stage. It should be noted that the MDC coding can be applied at other stages in the encoding process.

Referring back to the process 200 in FIG. 2, the media source stream 202 is received by the MDC encoder. The term "receive" used herein can refer to receiving, inputting, acquiring, retrieving, obtaining, reading, accessing, or any action in any manner for inputting information or data. For example, the media source stream 202 can be a video stream and include a series of video pictures (e.g., a current picture).

At packetization stage 204, a first number (M1) of raw descriptions are generated for the media source stream 202. For example, the media source stream 202 can be divided or decomposed into consecutive blocks. The length or size of each block can be fixed or variable. For ease of explanation, fixed-length blocks will be described as examples hereinafter without departing from the scope of this disclosure. For example, each block can be further divided into multiple (e.g., M1) sub-blocks. Each sub-block can be further divided into multiple (e.g., L) samples. The samples can be the coding unit for the media source stream 202, including, for example, audio samples for an audio stream, or pictures for a video stream. The structure of each of the consecutive blocks can be identical. To ease explanation without losing generality, operations for a current block will be described as an example hereinafter, and can be similarly applied to other blocks of the consecutive blocks. After the division or decomposition, the consecutive blocks can be duplicated to form the M1 raw descriptions, in which the current block is duplicated to form M1 duplicate blocks (including the current block itself) in respective M1 raw descriptions. The M1 raw descriptions can be identical. For example, each of the M1 raw descriptions can include M1 sub-blocks, and each of the M1 sub-blocks can include L samples.

At MDC gain generation stage 206, multiple forward gain factors are generated for MDC gain control. In an implementation, the forward gain factors can be complementary. "Complementary" herein can refer to gain factors that complement each other (e.g., subject to a predetermined relationship), such that, after applying the gain factors to (e.g., scaling) multiple descriptions (e.g., duplicate blocks included in the descriptions), the scaled descriptions can be used to substantially fully reconstruct the original media source stream under ideal cases (e.g., with no loss of data). In an implementation, the forward gain factors can include a pair of complementary gain factors: a primary forward gain factor and a secondary gain factor. It should be noted that the number of the forward gain factors used herein can be any number (e.g., 1, 2, 3, 4, or any suitable number) depending on different implementations, and not limited to be 2. In an implementation, the number of the forward gain factors are two. The forward gain factors can be selected based on characteristics (e.g., energy characteristics, or statistic characteristics) of the media source stream 202, and the selection can depend on specific designs of the MDC gain generation stage 206. More details of the selection of the forward gain factors will be discussed in the description related to FIGS. 4-7.

At MDC gain control stage 208, M1 non-identical descriptions are generated by applying the forward gain factors generated at the MDC gain generation stage 206 to the M1 raw descriptions generated at the packetization stage 204. For example, the M1 duplicate blocks of corresponding to the current block can be scaled using the forward gain factors. For example, a $j^{th}$ sub-block in a duplicate block can be scaled by the primary gain factor, and other sub-blocks in the same duplicate block can be scaled by the secondary gain factor. For different duplicate blocks in different raw descriptions, the $j^{th}$ sub-block can be selected differently (i.e., j is selected as a different number for respective duplicate blocks corresponding to the current block). By such operation, the M1 non-identical descriptions can be generated from the M1 identical raw descriptions. More details of the MDC gain control using the forward gain factors will be discussed in the description related to FIGS. 4-7.

At the quantization stage 210, the M1 descriptions are quantized to generate quantization data. For example, the M1 descriptions can be converted into M1 streams of quantization indices to form the quantization index streams 212. For example, one or more scalar or vector quantizers can be used in this stage. It should be noted that different techniques for quantization can be selected and are not limited to any specific quantization scheme in this disclosure. In an implementation, for example, different bit allocation schemes can be applied to obtain M1 different quantization index streams. In some implementations, prior to performing the bit allocation, entropy encoding can be performed to remove redundancy in the quantization indices.

In some implementations, prior to or after the quantization stage 210, one or more error correction techniques can be further applied to the multiple descriptions. The one or more error correction techniques can include, for example, FEC, ARQ, or PLC.

Figure 3:
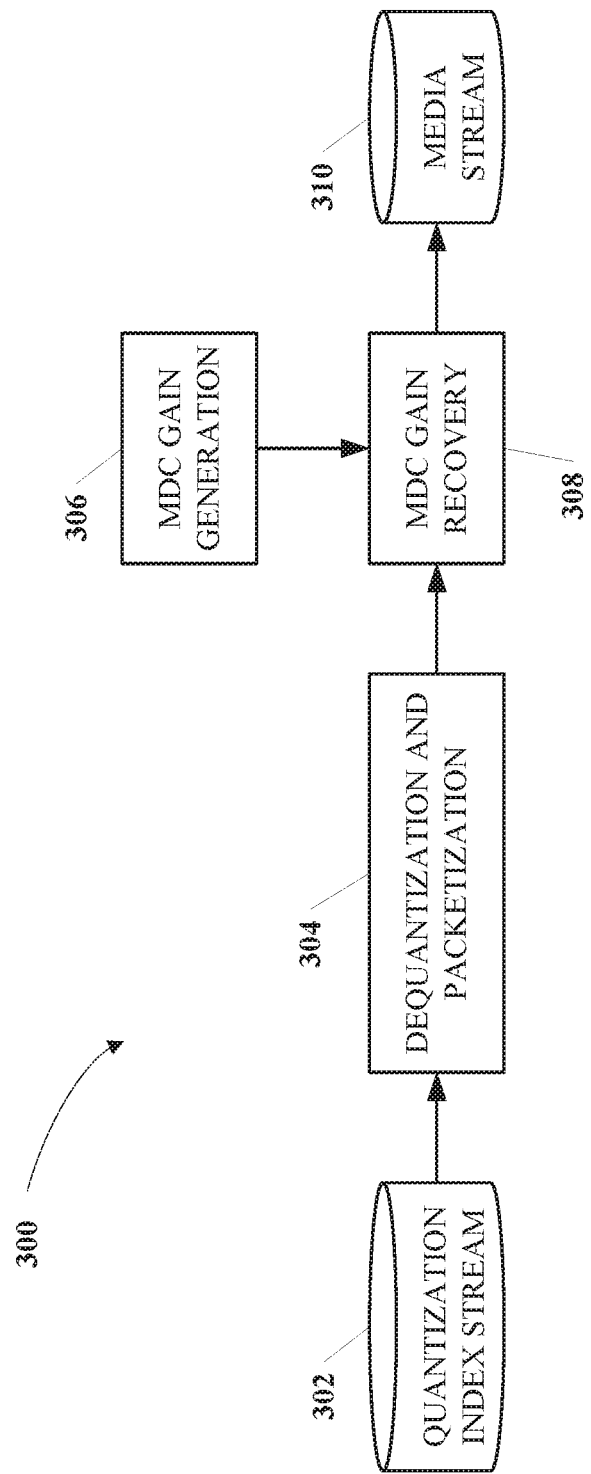
FIG. 3 is a diagram of an example MDC decoding process according to implementations of this disclosure.

FIG. 3 is a diagram of an example MDC decoding process 300 according to implementations of this disclosure. The process 300 can be implemented as software and/or hardware modules in the system 100 in FIG. 1. For example, some or all stages of the process 300 can be implemented as software or hardware modules included in the system 100 by a decoder (e.g., the apparatus 102). The decoder can be implemented by program codes stored in memory (e.g., the memory 110). The program codes can include computer-readable instructions that, when executed by a processor (e.g., the processor 108), cause the decoder to decode a quantization index stream in the manner described in FIG. 3. The decoder can also be implemented as specialized hardware included in an apparatus (e.g., the apparatus 102). For example, the decoder can be a hardware decoder. The process 300 includes operations 302-310 to produce a media stream 310 from a quantization index stream 302. The media stream 310 can include an audio stream, a video stream, or any multimedia stream including audio and video data.

For an MDC-compatible decoder, the decoding process is the reversal of the encoding process. The decoder can receive a media stream (e.g., a media bitstream) that includes a quantization index stream, which can be further decoded to one or more descriptions. There might be errors or missing packets in the received encoded descriptions, but based on MDC decoding, the decoded media stream can maintain relatively high fidelity or quality. Typical audio and video decoding processes will be described as follows.

Generally, when decoding a video bitstream, the decoding process is similar to the reconstruction path of the video encoding process and can include the following stages or operations: an entropy decoding stage, a dequantization and inverse transformation stage, a prediction stage, and a reconstruction stage. It should be noted that other structural variations of the decoding process can be used to decode the video bitstream.

The video bitstream can be received by the decoder and entropy decoded at the entropy decoding stage. For example, encoded data representing a current picture of the video bitstream ("current picture data") can be received.

At the entropy decoding stage, the current picture data can be entropy decoded to a state before being entropy encoded.

The entropy decoded current picture data can include motion data (e.g., motion vectors for motion compensation) and transformed and quantized residual data. Information indicating the current picture being intra-predicted or inter-predicted can also be entropy decoded from the current picture data for the decoder to determine which prediction mode to perform. The transformed and quantized residual data can then be dequantized and inverse transformed at the dequantization and inverse transformation stage to determine residual data. In some implementations, the dequantization and inverse transformation stage can be implemented as one stage or two separate stages.

The residual data can include data for intra- or inter-prediction. The intra-prediction can use spatial dependencies of the same picture (e.g., the current picture) for video compression. For example, the intra-prediction can predict the contents (e.g., pixel values) of a block of the current picture (referred to as a "current block") by determining from previously processed reference blocks (e.g., spatially nearby blocks) of the current picture whether contents of the reference blocks are similar to the current block. For example, if the original video is processed and compressed in a raster scan order, blocks prior to the current block (e.g., in the raster scan order) can be used as the reference blocks for intra-prediction, because they can be reconstructed prior to the current block and will be available when reconstructing the current block. For example, if the prediction mode is determined to be the intra-prediction, the residual data can include the reference blocks and the residual blocks.

The inter-prediction can use temporal dependencies between pictures for video compression. The inter-prediction can perform motion estimation using a current picture and one or more reference pictures (e.g., temporally nearby pictures of the current picture), and then perform motion compensation for the current picture. For example, the motion compensation can move (e.g., translate) portions (e.g., slices, tiles, macroblocks, or blocks) of the reference pictures in accordance with the motion vectors to construct the motion-compensated picture. For example, if the prediction mode is determined to be the inter-prediction, the residual data can include the reference pictures and the residual pictures.

At the prediction stage, the predicted picture of the current picture can be determined in an inter-prediction mode or an intra-prediction mode. The decoded current picture data can include syntax data (e.g. parameters) to indicate the decoder which prediction mode to use.

In an example, for inter-prediction, motion compensation can be performed and a motion-compensated picture (a "predicted picture") can be determined using the motion data (e.g., the motion vectors) and reference data (e.g., reference pictures, reference slices, reference tiles, reference macroblocks, or reference blocks) of the current picture. In another example, for intra-prediction, the predicted picture can be determined using reference blocks (e.g., included in the residual data), then added with the residual data (e.g., the residual pictures).

At the reconstruction stage, a reconstructed picture of the current picture can be determined. The reconstruction stage can be similar to the reconstruction stage in the video encoding process. For example, the reconstructed picture can be determined by adding the predicted picture determined at the prediction stage to the residual data (e.g., the residual pictures) determined at the dequantization and inverse transformation stage. The reconstructed picture can be outputted in a video sequence. In some implementations, the reconstructed picture can be filtered using a loop filter after the reconstruction stage. In another example, the reconstructed picture can be outputted without using the loop filter. The video sequence can be outputted for display on a screen. The video sequence can also be outputted as a computerized file stored in a storage medium.

After the reconstruction stage, the reconstructed picture can be used as future reference data for processing a future picture successive to the current picture at the prediction stage. In addition to being outputted in the video sequence, the reconstructed picture can also be stored in a buffer (e.g., in the memory 110 in FIG. 1) to be used as the future reference data. In some implementations, the future reference data can be filtered using a loop filter before being used at the prediction stage.

An audio bitstream can be decoded like the video bitstream, or using any audio decompression techniques. For example, audio decompression can include the following stages: a bitstream decoding stage, a dequantization and reconstruction stage, and an inverse mapping stage. Other stages can be used to replace or in addition to the stages in the example.

It should be noted that other variations of the decoding process can be used to decode the video bitstream. The data and operations in the decoding process can be processed and performed in different orders, combined into fewer stages, and/or divided into more stages without changing its purpose.

In some implementations, the MDC decoding can be implemented prior to, after, or during any stage of the above-described audio or video decoding process. For example, the MDC decoding can be performed between the dequantization and reconstruction stage and the inverse mapping stage of the audio decoding process. For another example, the MDC decoding can be performed after the dequantization and prior to the inverse transformation of the video decoding process. For another example, the MDC decoding can be performed in a decoding process that has no transformation stage. It should be noted that the MDC decoding can be applied in the decoding process not limited to any above-described example stages, and some or all of the subsequent stages in the decoding process can be performed on the received and reconstructed multiple descriptions.

Referring back to the process 300, the quantization index stream 302 is received by the MDC decoder. At dequantization and packetization stage 304, quantization indices in the quantization index stream 302 are dequantized and converted to recover a second number (M2) of descriptions. Typically, due to errors introduced in quantization and network transmission, the M2 recovered descriptions are not identical to their corresponding original descriptions. In addition, due to network congestion or packet loss, the MDC decoder might recover descriptions less than the original encoded descriptions (i.e., M2 can be less than M1).

At MDC gain generation stage 306, a set of backward gain factors are generated for scaling the recovered descriptions. In an implementation, the backward gain factors can include a primary backward gain factor and a secondary backward gain factor. It should be noted that the number of the backward gain factors used herein can be any number (e.g., 1, 2, 3, 4, or any suitable number) and not limited to be 2. In an implementation, each backward gain factor can be a reciprocal of its corresponding forward gain factor used in the MDC encoding process. For example, the primary backward gain factor can be the reciprocal of the primary forward gain factor, and the secondary backward gain factor can be the reciprocal of the secondary forward gain factor.

More details of the backward gain factors will be discussed in the description related to FIGS. 5-7.

At MDC gain recovery stage 308, the media stream 310 are reconstructed by applying the backward gain factors determined at the MDC gain generation stage 306 to the descriptions recovered at the dequantization and packetization stage 304. Depending on specific data received and recovered in the recovered descriptions, different approaches can be used to reconstruct the media stream 310. More details of the MDC gain recovery will be discussed in the description related to FIGS. 5-7.

Figure 4:
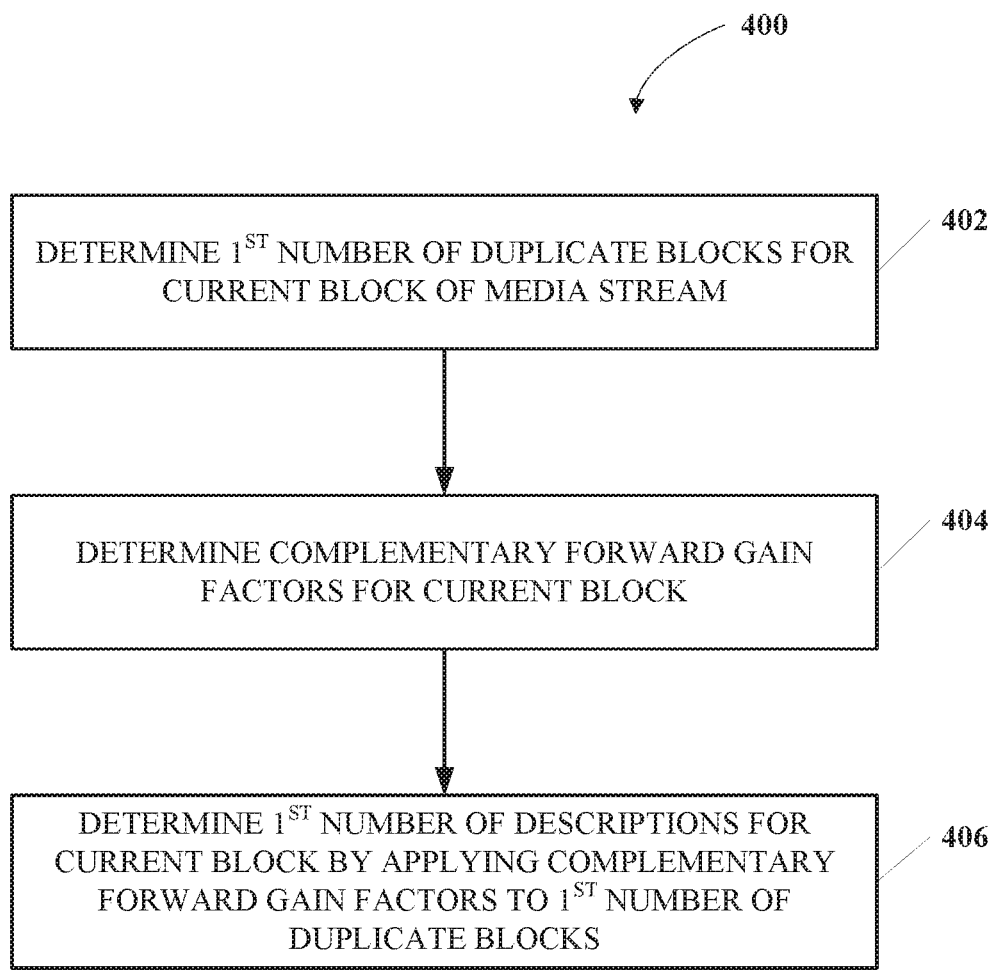
FIG. 4 is a flowchart of an example process of MDC encoding for a media source stream according to implementations of this disclosure.

FIG. 4 is a flowchart of an example process 400 of encoding multiple descriptions for a media source stream according to implementations of this disclosure. The media source stream can include an audio source stream, a video source stream, or any media stream including audio and/or video data. The process 400 can be implemented as software and/or hardware modules in the system 100 in FIG. 1. For example, the process 400 can be implemented as modules included in an encoder (e.g., the apparatus 104 in FIG. 1). The operations of the process 400 can also be implemented as machine-readable instructions to implement stages 204-208 in the process 200 in FIG. 2. The process 400 includes data and operations 402-406 to produce a quantization index stream from the media source stream, which are set forth as follows.

At operation 402, a first number (M1) of duplicate blocks are determined for a current block of the media source stream. The operation 402 can be performed to implement the packetization stage 204 in FIG. 2. In an implementation, prior to the operation 402, the media source stream can be divided or decomposed into consecutive blocks. The current block can be any block of the consecutive blocks, and the operations for the current block described hereinafter can be similarly applied to other blocks of the current block. The media source stream can include one-dimensional (e.g., audio data), two-dimensional (e.g., video data), or of any dimension of any media data. In some implementations, multi-dimensional media data can be converted or transformed to be one-dimensional using existing techniques. For ease of explanation, the media source stream will be described as one-dimensional hereinafter, and it should be noted that the operations for the one-dimensional media source stream can be derived to be applied to multi-dimensional media source streams, which is transformable to one-dimensional, without any creative effort.

Figure 6:
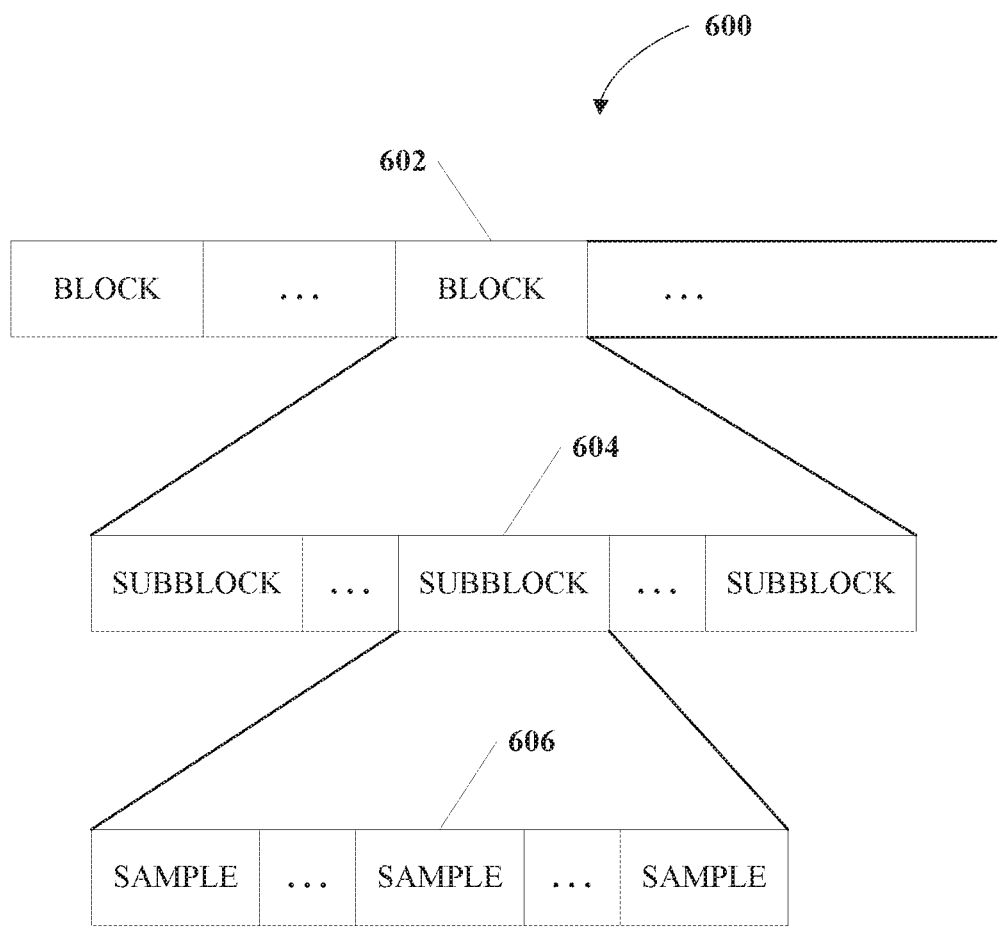
FIG. 6 is a diagram of structures of a media source stream.

FIG. 6 shows structures of a media source stream 600. As shown in FIG. 6, the media source stream 600 is divided into consecutive blocks, including a current block 602. The consecutive blocks, including the current block 602, can have identical structures. For example, the current block 602 can be further divided into multiple sub-blocks (e.g., M1 sub-blocks), including a sub-block 604. The sub-blocks of the current block 602, including the sub-block 604, can also have identical structures. For example, the sub-block 604 can be further divided into multiple samples (e.g., L samples). If the media source stream 600 is an audio stream, for example, any sample of the sub-block 604 (e.g., a sample 606) can be a coding unit of audio data (e.g., an audio sequence unit). If the media source stream is a video stream, for example, any sample of the sub-block 604 (e.g., the sample 606) can be a coding unit of video data (e.g., a block, a macroblock, a sequence, a slice, a tile, or a picture).

After the division or decomposition of the media source stream, the consecutive blocks can be duplicated to form M1 raw descriptions, in which the current block can be duplicated at the operation 402 to form M1 duplicate blocks (including the current block itself). The M1 raw descriptions can be identical.

Figure 7:
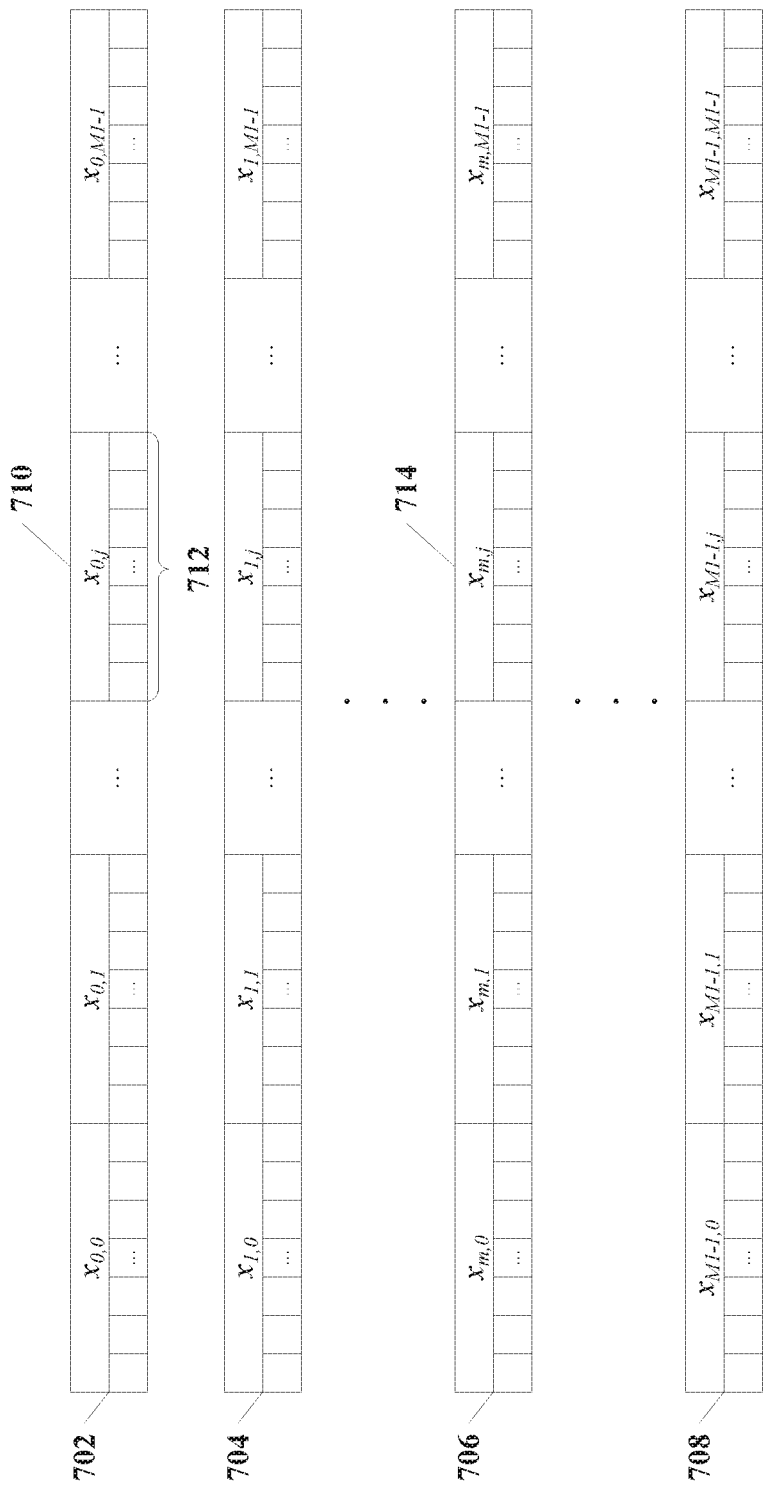
FIG. 7 is a diagram of structures of duplicate blocks corresponding to a current block of a media source stream.

FIG. 7 shows structures of the M1 duplicate blocks corresponding to the current block. As shown in FIG. 7, the current block 702 includes M1 sub-blocks, represented by symbols $x_{0,0}, x_{0,1}, \ldots, x_{0,M1-1}$. Each sub-block includes L samples. For example, a sub-block 710 of the current block 702 includes samples 712 with a size of L. It should be noted that, the size of the samples (i.e., L) can be the same or different for different sub-blocks in this disclosure. The current block 702 can be duplicated for multiple times at the operation 402. For example, as shown in FIG. 7, the current block 702 are duplicated for (M1−1) times to generate M1 duplicate blocks, including: the zeroth duplicate block 702 (i.e., 702 itself); the first duplicate block 704; ... the $m^{th}$ duplicate block 706; ... ; and the $(M1-1)^{th}$ duplicate block 708. The M1 duplicate blocks can be identical. For example, for the $m^{th}$ duplicate block 706, a sub-block 714 ($x_{m,j}$) can include L samples s(i) expressed as:

$$x_{m,j}=[s(jL)\ s(jL+1)\ \ldots\ s(jL+L-1)], \text{ for } m,j=0,1,\ldots M1-1 \qquad \text{Eq. (1)}$$

Refer back to FIG. 4, at operation 404, a plurality of forward gain factors is determined for the current block. The operation 404 can be performed to implement the MDC gain generation stage 206 in FIG. 2. The forward gain factors can be used to scale the M1 raw descriptions. In some implementations, the forward gain factors can be complementary. The forward gain factors can be determined based on characteristics (e.g., energy characteristics, or statistic features) of the media source stream. In some implementations, the forward gain factors can be designed to have some or all of the following features. The forward gain factors can be designed such that the dynamic range of each raw description can be compressed for reducing the original bit rate. The forward gain factors can be designed such that the total energy of each description scaled by the forward gain factors can be less than or equal to the original energy of its corresponding sub-blocks. The forward gain factors can be designed such that each encoded description can be independently decoded with a certain level of fidelity or confidence. The forward gain factors can be designed such that the multiple encoded descriptions are complementary to each other, and when the more descriptions are received, the better quality can the reconstruction achieve.

For example, a pair of complementary forward gain factors can be determined at the operation 404, including a primary forward gain factor $\alpha_0$ and a secondary forward gain factor $\alpha_1$. The $\alpha_0$ and $\alpha_1$ can be designed to have the aforementioned features. In an implementation, the $\alpha_0$ and $\alpha_1$ can be determined as:

$$\frac{1}{M1} \leq \alpha_0 < 1 \text{ and } \alpha_1 = \frac{1-\alpha_0}{M1-1} \qquad \text{Eq. (2)}$$

It can be derived from Eq. (2) that $\alpha_0 \geq \alpha_1$, hence $\alpha_0$ is referred to as the primary forward gain factor. It can also be derived from Eq. (2) that, when $\alpha_0$ increases, $\alpha_1$ decreases; and vice versa. In addition, $\alpha_0$ and $\alpha_1$ are between zero and one. It should be noted that, the $\alpha_0$ can be determined at any specific value as long as it conforms to Eq. (2). For any $\alpha_0$ and $\alpha_1$ conforming to Eq. (2), the total energy of each description scaled by the $\alpha_0$ and $\alpha_1$ cannot exceed the original energy of its corresponding sub-blocks. In this case, the $\alpha_0$ and $\alpha_1$ can be referred to as "complementary," and this feature can be more clearly shown in Eq. (3) as a rearrangement of Eq. (2):

$$\alpha_0 + \alpha_1(M1-1) = 1 \qquad \text{Eq. (3)}$$

At operation 406, M1 descriptions are determined for the current block by applying the plurality of complementary forward gain factors to the M1 duplicate blocks. The M1 descriptions can be non-identical. The operation 406 can be performed to implement the MDC gain control stage 208 in FIG. 2. Each of the M1 non-identical descriptions can include a scaled block corresponding to the current block, and the scaled block can be determined by applying the forward gain factors to the corresponding duplicate block.

For example, for a raw description of the M1 raw descriptions that includes a duplicate block corresponding to the current block, the forward gain factors can be applied (e.g., multiplied, added, divided, subtracted, powered, or used in any linear or nonlinear operation for scaling) to sub-blocks of the duplicate block. The forward gain factors can be used to adjust (e.g., increase or decrease) the power or amplitude of a signal (e.g., the duplicate block). For example, a sub-block in the duplicate block can be scaled by $\alpha_0$ (referred to as a "primary sub-block"), and sub-blocks other than the primary sub-block in the duplicate block can be scaled by $\alpha_1$ (referred to as "secondary sub-blocks"). In this example, each sample of the primary sub-block is scaled (e.g., multiplied) by $\alpha_0$, and each sample of the secondary sub-blocks is scaled (e.g., multiplied) by $\alpha_1$.

Different raw descriptions can include respective duplicate blocks corresponding to the current block, and the primary sub-blocks of the respective duplicate blocks can be at different positions. For example, the primary sub-block of a first duplicate block in a first raw description can have a position different from the primary sub-block of a second duplicate block in a second raw description, in which the first and second duplicate blocks are copies of the current block.

For example, the first duplicate block can be the $n^{th}$ ($0 \leq n \leq M-1$) duplicate block of the current block (i.e., the first description is the $n^{th}$ raw description), and the first primary sub-block can be represented by $x_{n,i}$ (i.e., the first primary sub-block is the $i^{th}$ sub-block of the first duplicate block). The second duplicate block can be the $l^{th}$ ($0 \leq l \leq M-1$ and $l \neq n$) duplicate block of the current block (i.e., the second description is the $l^{th}$ raw description), and the second primary sub-block can be represented by $x_{l,k}$ (i.e., the second primary sub-block is the $k^{th}$ sub-block of the second duplicate block). In this example, the position of $x_{n,i}$ in the first duplicate block is different from the position of $x_{l,k}$ in the second duplicate block (i.e., $i \neq k$).

For each duplicate block corresponding to the current block, the position of its primary sub-block can be different from other duplicate blocks. In an implementation, the positions of the primary sub-blocks are all different in the duplicate blocks. For ease of explanation without losing generality, the M1 duplicate blocks (e.g., including duplicate blocks 702-708) as shown in FIG. 7 can be expressed in a form of a matrix with a size of M1×M1. The matrix can be shown as:

$$\begin{bmatrix} x_{0,0} & x_{0,1} & \cdots & x_{0,M1-1} \\ x_{1,0} & \ddots & & x_{1,M1-1} \\ \vdots & & \ddots & \vdots \\ x_{M1-1,0} & x_{M1-1,1} & \cdots & x_{M1-1,M1-1} \end{bmatrix} \qquad \text{Eq. (4)}$$

In Eq. (4), each row represents a duplicate block in a raw description. It should be noted that, for any duplicate block, the $\alpha_0$ can be applied to any number of its sub-blocks (i.e., the primary sub-blocks can be any number), not limited to one. For different applications, the number of the primary sub-blocks can be designed as any number.

In an implementation, there can be only one primary sub-block in each duplicate block, and the primary sub-blocks of different duplicate blocks can have positions different from each other. In other words, in this implementation, in Eq. (4), there can be only one sub-block in each row that can be scaled by $\alpha_0$, and only one sub-block in each column that can be scaled by $\alpha_0$. In this implementation, all other duplicate sub-blocks in Eq. (4) can be scaled by $\alpha_1$. This can be implemented in various ways. For example, corresponding to the arrangements of the sub-blocks in Eq. (4), the forward gain factors can be arranged as a M1×M1 matrix expressed in:

$$\begin{bmatrix} \alpha_0 & \alpha_1 & \cdots & \alpha_1 \\ \alpha_1 & \alpha_0 & \cdots & \alpha_1 \\ \cdots & \cdots & \cdots & \cdots \\ \alpha_1 & \alpha_1 & \cdots & \alpha_0 \end{bmatrix} \qquad \text{Eq. (5)}$$

In Eq. (5), each row or each column can be referred to as a "forward gain vector." Each forward gain vector includes one primary gain factor ($\alpha_0$) and (M1−1) secondary gain factors ($\alpha_1$). The primary gain factor and any of the secondary gain factors are complementary to each other as shown by Eq. (2) and Eq. (3). Moreover, the summation of the values of each forward gain vector is equal to one.

In Eq. (5), only the diagonal positions have $\alpha_0$ and all other positions have $\alpha_1$, which can be expressed as:

$$\text{forward gain factor} = \begin{cases} \alpha_0, & \text{if } m = j \\ \alpha_1, & \text{if } m \neq j \end{cases} \qquad \text{Eq. (6)}$$

The $\alpha_0$ and $\alpha_1$ in Eq. (5) can be applied to corresponding sub-blocks in Eq. (4). For example, an entry-wise product (or "Hadamard product") can be performed between Eq. (4) and Eq. (5), i.e.

$$\begin{bmatrix} x_{0,0} & x_{0,1} & \cdots & x_{0,M1-1} \\ x_{1,0} & \ddots & & x_{1,M1-1} \\ \vdots & & \ddots & \vdots \\ x_{M1-1,0} & x_{M1-1,1} & \cdots & x_{M1-1,M1-1} \end{bmatrix} \circ \begin{bmatrix} \alpha_0 & \alpha_1 & \cdots & \alpha_1 \\ \alpha_1 & \alpha_0 & \cdots & \alpha_1 \\ \cdots & \cdots & \cdots & \cdots \\ \alpha_1 & \alpha_1 & \cdots & \alpha_0 \end{bmatrix} =$$

$$\begin{bmatrix} \alpha_0 x_{0,0} & \alpha_1 x_{0,1} & \cdots & \alpha_1 x_{0,M1-1} \\ \alpha_1 x_{1,0} & \ddots & & \alpha_1 x_{1,M1-1} \\ \vdots & & \ddots & \vdots \\ \alpha_1 x_{M1-1,0} & \alpha_1 x_{M1-1,1} & \cdots & \alpha_0 x_{M1-1,M1-1} \end{bmatrix} =$$

$$\begin{bmatrix} y_{0,0} & y_{0,1} & \cdots & y_{0,M1-1} \\ y_{1,0} & \ddots & & y_{1,M1-1} \\ \vdots & & \ddots & \vdots \\ y_{M1-1,0} & y_{M1-1,1} & \cdots & y_{M1-1,M1-1} \end{bmatrix}$$

For another example, corresponding to the arrangements of the sub-blocks in Eq. (4), the forward gain factors can also be arranged as a M1×M1 matrix expressed in:

$$\begin{bmatrix} \alpha_1 & \alpha_1 & \ldots & \alpha_0 \\ \ldots & \ldots & \ldots & \ldots \\ \alpha_1 & \alpha_0 & \ldots & \alpha_1 \\ \alpha_0 & \alpha_1 & \ldots & \alpha_1 \end{bmatrix} \quad \text{Eq. (7)}$$

In Eq. (7), only the anti-diagonal positions have $\alpha_0$ and all other positions have $\alpha_1$. The $\alpha_0$ and $\alpha_1$ in Eq. (7) can be applied to corresponding sub-blocks in Eq. (4). For example, an entry-wise product can be performed between Eq. (4) and Eq. (7).

It should be noted that, Eq. (5) and Eq. (7) are only two examples of the implementation in which each duplicate block of a raw description includes only one primary sub-block. Other arrangements of the forward gain factors are possible and can be derived without creative effort. For ease of explanation without losing generality, Eq. (5) will be used as an example arrangement of the forward gain factors hereinafter.

By applying the forward gain factors shown in Eq. (5) to the sub-blocks shown in Eq. (4), M1 scaled blocks can be determined, in which each scaled block includes M1 scaled sub-blocks. For example, the M1×M1 scaled sub-blocks, represented by symbols $y_{m,j}$ (m,j=0,1, . . . , M1−1), can be determined as:

$$y_{m,j} = \begin{cases} \alpha_0 x_{m,j}, & \text{for } m = j \\ \alpha_1 x_{m,j}, & \text{for } m \neq j \end{cases} \quad \text{Eq. (8)}$$

In this implementation, because $\alpha_0$ is assigned to a different column in each row, the resulting M1 scaled descriptions, which includes the M1 scaled blocks $y_{m,j}$ (m, j= 0, 1, . . . , M1−1), are no longer identical. In addition, because $\alpha_0$ and $\alpha_1$ are between 0 and 1, the dynamic range of each scaled description can be smaller than or equal to its corresponding raw description. By such implementations, the bit rate of each scaled description can be smaller than or equal to the bit rate of its corresponding original data sample (e.g., the original consecutive blocks).

In some implementations, scaling $x_{m,j}$ using the forward gain factors can include various operations in addition to multiplying to adapt to different data types or computation environments (e.g., integer, fixed-point, or floating-point). For example, for an integer or floating-point type, a rounding operation (e.g., a flooring operation, a ceiling operation, or a round-off operation) can be applied to the sub-blocks as scaled in accordance with Eq. (8), and the information truncated by the rounding operation (e.g., truncated mantissa of a scaled sub-block) can be encoded into the descriptions using various methods (e.g., encoded as additional integer bits). Such various operations can be used to further improve quality of the reconstructed signal, the details of which will not be further discussed hereinafter.

In some implementations, after the operation 406, the M1 scaled descriptions can be quantized to generate quantization data (e.g., a quantization index stream), which can be performed to implement the quantization stage 210 in FIG. 2. The details of the quantization operation can be referred to the description in FIG. 2 and will not be further discussed hereinafter. After the quantization, the M1 scaled descriptions can be converted to M1 streams of quantization indices.

In some implementations, after the quantization, the M1 streams of quantization indices can be entropy coded to form a bitstream for transmission (e.g., via the network 106 in FIG. 1). For example, the bitstream can include a quantization index stream that includes the quantization indices.

Figure 5:
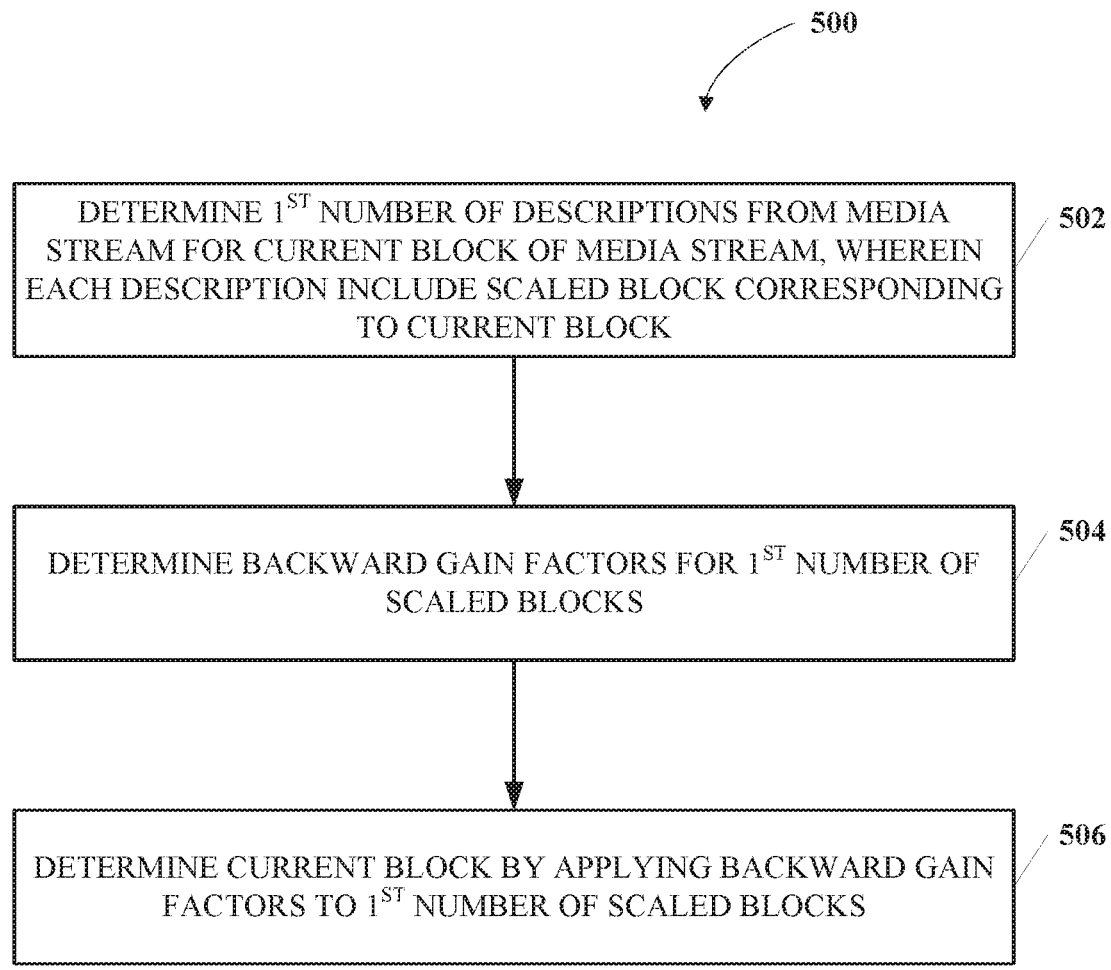
FIG. 5 is a flowchart of an example process of MDC decoding for a media stream according to implementations of this disclosure.

FIG. 5 is a flowchart of an example process 500 of decoding a quantization index stream for reconstructing a media stream according to implementations of this disclosure. The quantization index stream can be included in a received media stream (e.g., a media bitstream). The reconstructed media stream can include an audio stream, a video stream, or any media stream including audio and/or video data. The process 500 can be implemented as software and/or hardware modules in the system 100 in FIG. 1. For example, the process 500 can be implemented as modules included in a decoder (e.g., the apparatus 102 in FIG. 1). The operations of the process 500 can also be implemented as machine-readable instructions to implement stages 304-308 in the process 300 in FIG. 3. The process 500 includes operations 502-506 to produce the reconstructed media stream from the received media stream, which are set forth as follows.

At operation 502, a first number (M2) of descriptions are determined from the media stream for a current block of the media stream. The current block is a block of the media stream that is being decoded by a decoder. The operation 502 can be performed to implement the dequantization and packetization stage 304 in FIG. 3. For example, the media stream can include quantization data (e.g., a quantization index stream). The quantization data can be entropy decoded (e.g., to restore M2 streams of quantization indices), which can be further dequantized to recover the M2 scaled descriptions. Each of the M2 descriptions can include a scaled block corresponding to the current block. The M2 descriptions can include M2 scaled blocks corresponding to the current block. When being encoded at an encoder, the media stream can be divided or decomposed into consecutive blocks including the current block.

In an implementation, the encoder can generate a second number (e.g., M1) of raw descriptions for the media stream, each raw description including a duplicate block corresponding to the current block. Each of the M1 duplicate blocks (including the current block itself) can further include M1 sub-blocks. For a duplicate block, each of the M1 sub-blocks can further include a third number (e.g., L) of samples (e.g., audio samples for an audio stream, or pictures for a video stream). The division or decomposition of the media stream at the encoder can be identical for each of the M1 duplicate blocks.

In an implementation, the encoder can generate and apply forward gain factors to the M1 raw descriptions to generate M1 non-identical descriptions. For example, a primary forward gain factor $\alpha_0$ and a secondary forward gain factor $\alpha_1$ can be applied to the M1 raw descriptions to generate M1 scaled descriptions. In an implementation, the forward gain factors can be complementary. For example, M1 scaled blocks can be generated by applying the forward gain factors to the M1 duplicate blocks. Details of the application of the forward gain factors can be referred to description related to FIGS. 4, 6, and 7, and will not be further described hereinafter.

Due to network congestion or packet loss, for any block of the consecutive blocks, the number of the scaled blocks corresponding to the block recovered by the decoder can be equal to or less than the number of the scaled blocks generated by the encoder. For example, in the above implementation, M2 can be equal to or less than M1.

At operation 504, backward gain factors are determined for the M2 scaled blocks. The operation 504 can be performed to implement the MDC gain generation stage 306 in FIG. 3. The backward gain factors can be corresponding to forward gain factors used at the encoder. For example, the backward gain factors can include a primary backward gain factor $\beta_0$ corresponding to $\alpha_0$, and a secondary backward gain factor $\beta_1$ corresponding to $\alpha_1$.

In an implementation, the backward gain factors can be reciprocals of the corresponding forward gain factors. For example, $\beta_0$ can be $1/\alpha_0$, and $\beta_1$ can be $1/\alpha_1$. It should be noted that, depending on specific applications, the backward gain factors can be determined based on the forward gain factors using any linear or non-linear relations, not limited to the reciprocal relationship. The reciprocal relationship between the backward gain factors and the forward gain factors are used as examples only, and other forms of the backward gain factors can be derived and used in the implementations of this disclosure.

At operation 506, the current block is determined by applying the backward gain factors to the M2 scaled blocks. The operation 506 can be performed to implement the MDC gain recovery stage 308 in FIG. 3. For example, the current block can include multiple (e.g., M1) sub-blocks, and each of the M2 recovered scaled blocks can also include M1 scaled sub-blocks. In addition, each sub-block of the current block can have a corresponding scaled sub-block in each of the M2 scaled blocks. For example, a $j^{th}$ sub-block $z_j$ of the current block can correspond to M2 scaled sub-blocks $\hat{y}_{m,j}$ ($m=m_0, m_1, \ldots, m_{M2-1}$), and each of $\hat{y}_{m,j}$ is also a $j^{th}$ sub-blocks of the corresponding scaled block. In this example, $z_j$ can be determined by applying the backward gain factors to the $\hat{y}_{m,j}$.

For ease of explanation without losing generality, it can be assumed that the encoder applies the forward gain factors as shown in Eq. (5) to the M1 duplicate blocks as shown in Eq. (4), and generates M1×M1 scaled sub-blocks as shown in Eq. (8). The forward gain factors are also assumed to be complementary as shown in Eq. (3).

In addition, due to errors introduced in the quantization process and/or packet loss during transmission, the recovered scaled descriptions can be slightly different from the scaled descriptions generated at the encoder prior to the quantization process. For example, for a scaled sub-block $y_{m,j}$ (m and j can be any number between 0 and M1–1) generated before quantization at the encoder, it can be quantized (at the encoder) and recovered (at the decoder) as a corresponding scaled sub-block $\hat{y}_{m,j}$ expressed in:

$$\hat{y}_{m,j} \approx y_{m,j}, \text{ for } m,j=0,1,\ldots,M1-1 \quad \text{Eq. (9)}$$

For example, in some implementations, in light of Eq. (8), $\hat{y}_{m,j}$ can be seen as $$\hat{y}_{m,j} = \begin{cases} \alpha_0 \hat{x}_{m,j}, \text{ for } m = j \\ \alpha_1 \hat{x}_{m,j}, \text{ for } m \neq j \end{cases}$$

in which $\hat{x}_{m,j}$ is the approximation of the corresponding unscaled sub-block $x_{m,j}$.

It should be noted that, when M2 is less than M1, the M1-M2 missing scaled blocks corresponding to the current block can occur, not necessarily consecutively, in M1-M2 of the M1 scaled descriptions generated by the encoder. In other words, for a $j^{th}$ sub-block $z_j$ of the current block, if there are M1 scaled sub-blocks $y_{m,j}$ (m=0, 1, . . . , M1–1) generated by the encoder and M2 scaled sub-blocks $\hat{y}_{n,j}$ (n=$m_0, m_1, \ldots, m_{M2-1}$) recovered by the decoder, the set D={$m_0, m_1, \ldots, m_{M2-1}$} (M2<M1) can be any subset of {0, 1, . . . , M1–1} with a size of M2, and the numbers in the set D are not necessarily consecutive.

Based on the number and structure of the scaled descriptions recovered by the decoder, the current block can be determined in the following ways.

In a first example, when M2 is equal to M1, the decoder can recover M1 scaled blocks corresponding to the current block. The $z_j$ of the current block can be determined in accordance with:

$$z_j = \sum_{m=0}^{M1-1} \hat{y}_{m,j}, \text{ for } j = 0, 1, \ldots, M1-1 \quad \text{Eq. (10)}$$

By determining each sub-block of the current block in accordance with Eq. (10), the current block can be reconstructed in the first example.

In a second example, when M2 is greater than one but less than M1 and the M2 $\hat{y}_{m,j}$ for $z_j$ include a scaled sub-block $\hat{y}_{j,j}$ applied with the primary forward gain factor $\alpha_0$ (i.e., $\hat{y}_{j,j} \approx y_{j,j}$, and $y_{j,j} = \alpha_0 x_{j,j}$), $z_j$ can be determined in accordance with:

$$z_j = \hat{y}_{j,j} + \frac{M1-1}{M2-1} \sum_{m \in D, m \neq j} \hat{y}_{m,j}, \text{ for } j = 0, 1, \ldots, M1-1 \quad \text{Eq. (11)}$$

By determining each sub-block of the current block in accordance with Eq. (11), the current block can be reconstructed in the second example.

In a third example, when M2 is greater than one but less than M1 and the M2 $\hat{y}_{m,j}$ for $z_j$ does not include the $\hat{y}_{j,j}$, $z_j$ can be determined in accordance with:

$$z_j = \beta_1 \cdot \frac{1}{M2} \sum_{m \in D, m \neq j} \hat{y}_{m,j}, \text{ for } j = 0, 1, \ldots, M1-1 \quad \text{Eq. (12)}$$

By determining each sub-block of the current block in accordance with Eq. (12), the current block can be reconstructed in the third case. It can be seen from Eq. (12) that the secondary backward gain factor $\beta_1$ is applied to the M2 $\hat{y}_{m,j}$ (1<M2<M1). In an implementation, when $\beta_1 = 1/\alpha_1$, Eq. (12) can be further expressed as:

$$z_j = \frac{1}{\alpha_1 M2} \sum_{m \in D, m \neq j} \hat{y}_{m,j}, \text{ for } j = 0, 1, \ldots, M1-1 \quad \text{Eq. (12)}$$

In a fourth example, when M2=1 and the only term included in $\hat{y}_{m,j}$ is $\hat{y}_{j,j}$, $z_j$ can be determined in accordance with:

$$z_j = \beta_0 \cdot \hat{y}_{j,j}, \text{ for } j=0,1, \ldots, M1-1 \quad \text{Eq. (13)}$$

By determining each sub-block of the current block in accordance with Eq. (13), the current block can be reconstructed in the fourth case. It can be seen from Eq. (13) that the primary backward gain factor $\beta_0$ is applied to the M2 $\hat{y}_{m,j}$ (M2=1). In an implementation, when $\beta_0 = 1/\alpha_0$, Eq. (13) can be further expressed as:

$$z_j = \frac{1}{\alpha_0} \cdot \hat{y}_{j,j}, \text{ for } j = 0, 1, \ldots, M1-1$$

It can be seen from the previous cases that, when all M1 scaled descriptions are received and recovered (i.e., in the first case), the media stream can be reconstructed with a relatively high level of fidelity close to the original media source stream. When scaled descriptions are only partially received and recovered (i.e., in the second to fourth cases), the media stream can also be reconstructed with a certain level of fidelity. As can be seen from Eqs. (10) through (13), the more descriptions are received by the decoder (i.e., the closer is M2 to M1), the higher level of fidelity the media stream can be reconstructed.

In some implementations, the above-described methods (e.g., the processes 400 or 500) can be implemented as instructions stored in a non-transitory computer-readable medium. When being executed by a computer system using a processor, the instructions can become operational with the processor for performing the above-described methods. For example, the instructions stored in the non-transitory computer-readable medium can be executed for decoding multiple descriptions for a media stream. The media stream can include audio data and/or video data.

In some implementations, the non-transitory computer-readable medium can include instructions to: determine, for a current block of the media stream, a first number (M2) of descriptions from the media stream by dequantizing quantization data (e.g., a quantization index stream) decoded from the media stream, in which each description can include a scaled block corresponding to the current block; determine backward gain factors for the M2 scaled blocks; and determine the current block by applying the backward gain factors to the M2 scaled blocks.

In some implementations, the current block can include a second number (M1) of sub-blocks, and each sub-block can include a third number (L) of samples. In addition, each scaled block can include M2 scaled sub-blocks, and each scaled sub-block can include L scaled samples.

In some implementations, the backward gain factors can include a primary backward gain factor $\beta_0$ corresponding to a primary forward gain factor $\alpha_0$, and a secondary backward gain factor $\beta_1$ corresponding to a secondary forward gain factor $\alpha_1$. The $\alpha_0$ and the $\alpha_1$ have been applied to the first number of scaled blocks for encoding the current block (e.g., in a way described in FIGS. 2-5). In an implementation, the $\beta_0$ can be a reciprocal of $\alpha_0$, and the $\beta_1$ can be a reciprocal of $\alpha_1$. In an implementation, the $\alpha_0$ and the $\alpha_1$ can be determined to meet:

$$\alpha_0 + \alpha_1(M1-1) = 1$$

In addition, the $\alpha_0$ can be determined to meet:

$$\frac{1}{M1} \leq \alpha_0 < 1$$

In some implementations, to determine the current block, based on the number and structure of the scaled descriptions recovered by the decoder, the current block can be determined in the following ways.

In a first example, when M2 is equal to M1, a current sub-block can be determined for the current block by:

$$\sum_{m=0}^{M1-1} \hat{y}_m$$

wherein $\hat{y}_m$ are M2 scaled sub-blocks corresponding to the current sub-block. Each of the $\hat{y}_m$ can be included in a scaled block of the M2 scaled blocks corresponding to the current block.

In a second example, when M2 is greater than one but smaller than M1 and the $\hat{y}_m$ includes a sub-block $\hat{y}_j$ scaled by the $\alpha_0$, the current sub-block can be determined for the current block by $$\hat{y}_j + \frac{M1-1}{M2-1} \sum_{m \in D, m \neq j} \hat{y}_m,$$

wherein D is a set of indices with a size of M2 corresponding to the $\hat{y}_m$. Further details of D can be referred to the description of the operation 506 in the process 500.

In a third example, when M2 is greater than one but smaller than M1 and the $\hat{y}_m$ does not can include $\hat{y}_j$, the current sub-block can be determined for the current block by $$\beta_1 \cdot \frac{1}{M2} \sum_{m \in D, m \neq j} \hat{y}_m.$$

In a fourth example, when the $\hat{y}_m$ includes only $\hat{y}_j$, the current sub-block can be determined for the current block by $\beta_0 \cdot \hat{y}_j$.

According to implementations of this disclosure, a media source signal can be mapped to multiple descriptions for transmission. The disclosed apparatuses, methods, and systems of encoding and decoding multiple descriptions for the media stream can achieve high efficiency and can be easily integrated with existing coding systems.

As described above, a person skilled in the art should be noted that, all or a portion of aspects of the disclosure described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing, either singly or in combination. The terms "signal" and "data" are used interchangeably. Further, portions of the computing devices do not necessarily have to be implemented in the same manner.

The aspects herein can be described in terms of functional block components and various processing operations. The disclosed processes and sequences may be performed alone or in any combination. Functional blocks can be realized by any number of hardware and/or software components that perform the specified functions. For example, the described aspects can employ various integrated circuit components, e.g., memory elements, processing elements, logic elements, look-up tables, and the like, which can carry out a variety of functions under the control of one or more microprocessors or other control devices. Similarly, where the elements of the described aspects are implemented using software programming or software elements the disclosure can be implemented with any programming or scripting language such as C, C++, Java, assembler, or the like, with the various algorithms being implemented with any combination of data structures, objects, processes, routines or other programming elements. Functional aspects can be implemented in algorithms that execute on one or more processors. Furthermore, the aspects of the disclosure could employ any number of conventional techniques for electronics configuration, signal processing and/or control, data processing and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained in the apparatus, but is one that can be accessed remotely by the apparatus, and does not have to be contiguous with other memory that might be physically contained in the apparatus.

Any of the individual or combined functions described herein as being performed as examples of the disclosure can be implemented using machine readable instructions in the form of code for operation of any or any combination of the aforementioned hardware. The computational codes can be implemented in the form of one or more modules by which individual or combined functions can be performed as a computational tool, the input and output data of each module being passed to/from one or more further module during operation of the methods and systems described herein.

Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The particular aspects shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an aspect" or "one aspect" throughout is not intended to mean the same implementation or aspect unless described as such.

The use of "including" or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein is merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of examples, or exemplary language (e.g., "such as") provided herein, is intended merely to better illuminate the disclosure and does not pose a limitation on the scope of the disclosure unless otherwise claimed.

This specification has been set forth with various headings and subheadings. These are included to enhance readability and ease the process of finding and referencing material in the specification. These heading and subheadings are not intended, and should not be used, to affect the interpretation of the claims or limit claim scope in any way. The particular implementations shown and described herein are illustrative examples of the disclosure and are not intended to otherwise limit the scope of the disclosure in any way.

All references, including publications, patent applications, and patents, cited herein are hereby incorporated by reference to the same extent as if each reference were individually and specifically indicated as incorporated by reference and were set forth in its entirety herein.

While the disclosure has been described in connection with certain embodiments and implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for encoding multiple descriptions for a media stream, comprising:
   determining, for a current block of the media stream, a first number of duplicate blocks, wherein each duplicate block is identical to the current block, and the first number of duplicate blocks comprise more than one duplicate block;
   determining, for encoding the current block, a plurality of complementary forward gain factors; and
   determining, for encoding the current block, a first number of descriptions by applying the plurality of complementary forward gain factors to the first number of duplicate blocks, wherein each description is a scaled block without prediction and capable of being independently decoded for the current block, wherein each of the first number of descriptions is associated with a corresponding one of the plurality of complementary forward gain factors, and a sum of each corresponding one of the plurality of complementary forward gain factors applied to each of the first number of descriptions is a constant.

2. The method of claim 1, wherein the plurality of complementary forward gain factors comprises a primary forward gain factor $\alpha_0$ having a value between 0 and 1, and a secondary forward gain factor $\alpha_1$ having a value between 0 and 1, and the $\alpha_0$ is larger than the $\alpha_1$.

3. The method of claim 2, wherein the $\alpha_0$ and the $\alpha_1$ are determined to meet:

$$\alpha_1 + \alpha_1(M1-1) = 1$$

wherein M1 is the first number of descriptions.

4. The method of claim 3, wherein the $\alpha 0$ is determined to meet:

$$\frac{1}{M1} \leq \alpha_0 < 1.$$

5. The method of claim 2, wherein the current block comprises a first number of sub-blocks, and each sub-block comprises a second number of samples, and wherein each duplicate block comprises a first number of duplicate sub-blocks, and each duplicate sub-block comprises a second number of duplicate samples.

6. The method of claim 5, wherein determining the first number of descriptions for the current block by applying the plurality of complementary forward gain factors to the first number of duplicate blocks comprises:
   determining, for a duplicate block of the first number of duplicate blocks, a description by scaling a duplicate sub-block of the duplicate block with the $\alpha 0$, and scaling other duplicate sub-blocks of the duplicate block with the $\alpha 1$, wherein a position of the duplicate sub-block scaled with the $\alpha 0$ in each of the first number of duplicate blocks is different from each other.

7. The method of claim 1, wherein
   each description is capable of being independently decoded with a level of confidence, and
   a subset of the first number of descriptions is capable of being jointly decoded with another level of confidence, wherein the subset comprises at least one description of the first number of descriptions, and a larger subset is capable of being jointly decoded with a higher level of confidence.

8. The method of claim 1, wherein the first number of duplicate blocks and the first number of descriptions are determined for the current block after transformation and before quantization.

9. The method of claim 1, wherein the first number of duplicate blocks and the first number of descriptions are determined for the current block before quantization.

10. A non-transitory computer-readable medium storing instructions which when executed by a computer system using a processor become operational with the processor for encoding multiple descriptions for a media stream, the non-transitory computer-readable medium comprising instructions to:
    determine, for a current block of the media stream, a first number of duplicate blocks, wherein each duplicate block is identical to the current block, and the first number of duplicate blocks comprise more than one duplicate block;
    determine, for encoding the current block, a plurality of complementary forward gain factors; and
    determine, for encoding the current block, a first number of descriptions for the current block by applying the plurality of complementary forward gain factors to the first number of duplicate blocks, wherein each description is a scaled block without prediction and capable of being independently decoded for the current block, wherein each of the first number of descriptions is associated with a corresponding one of the plurality of complementary forward gain factors, and a sum of each corresponding one of the plurality of complementary forward gain factors applied to each of the first number of descriptions is a constant.

11. The non-transitory computer-readable medium of claim 10, wherein the plurality of complementary forward gain factors comprises a primary forward gain factor $\alpha 0$ having a value between 0 and 1, and a secondary forward gain factor al having a value between 0 and 1, and the $\alpha 0$ is larger than the $\alpha_1$.

12. The non-transitory computer-readable medium of claim 11, wherein the $\alpha_0$ and the $\alpha_1$ are determined to meet:

$$\alpha_0 + \alpha_1(M1+1) = 1$$

wherein M1 is the first number of descriptions.

13. The non-transitory computer-readable medium of claim 12, wherein the $\alpha_0$ is determined to meet:

$$\frac{1}{M1} \leq \alpha_0 < 1.$$

14. The non-transitory computer-readable medium of claim 11, wherein the current block comprises a first number of sub-blocks, and each sub-block comprises a second number of samples, and wherein each duplicate block comprises a first number of duplicate sub-blocks, and each duplicate sub-block comprises a second number of duplicate samples.

15. The non-transitory computer-readable medium of claim 14, wherein the instructions to determine the first number of descriptions for the current block by applying the plurality of complementary forward gain factors to the first number of duplicate blocks comprise instructions to:
    determine, for a duplicate block of the first number of duplicate blocks, a description by scaling a duplicate sub-block of the duplicate block with the $\alpha 0$, and scaling other duplicate sub-blocks of the duplicate block with the $\alpha 1$, wherein a position of the duplicate sub-block scaled with the $\alpha 0$ in each of the first number of duplicate blocks is different from each other.

16. The non-transitory computer-readable medium of claim 10, wherein
   each description is capable of being independently decoded with a level of confidence, and
   a subset of the first number of descriptions is capable of being jointly decoded with another level of confidence, wherein the subset comprises at least one description of the first number of descriptions, and a larger subset is capable of being jointly decoded with a higher level of confidence.

\* \* \* \* \*